United States Patent [19]

Gupta

[11] Patent Number: 4,850,412

[45] Date of Patent: Jul. 25, 1989

[54] RADIAL TIRES CONTAINING POLYAMIDE MONOFILAMENT

[75] Inventor: Dipak Gupta, Hockessin, Del.

[73] Assignee: E. I. Du Pont de Nemours and Company, Wilmington, Del.

[21] Appl. No.: 106,661

[22] Filed: Oct. 13, 1987

[51] Int. Cl.[4] .............................................. B60C 9/08
[52] U.S. Cl. .................... 152/556; 152/548; 152/560
[58] Field of Search ............... 152/548, 556, 560, 527, 152/451; 428/295; 57/902

[56] References Cited

U.S. PATENT DOCUMENTS

| | | | |
|---|---|---|---|
| 3,429,354 | 2/1969 | Brooks | 152/357 |
| 3,672,423 | 6/1972 | Duduk | 152/356 |
| 3,692,080 | 9/1972 | Boileau | 152/359 |
| 4,056,652 | 11/1977 | Gauntt | 428/400 |
| 4,360,050 | 11/1982 | Nakasaki | 152/354 |

FOREIGN PATENT DOCUMENTS

| | | | |
|---|---|---|---|
| 58-43802 | 3/1983 | Japan | 152/556 |
| 2172251 | 9/1986 | United Kingdom . | |

OTHER PUBLICATIONS

Product Licensing Index 9610-Apr., 1972.

*Primary Examiner*—Raymond Hoch

[57] ABSTRACT

A pneumatic radial tire, wherein each carcass ply contains a rubberized layer of load bearing polyamide monofilaments.

9 Claims, No Drawings

RADIAL TIRES CONTAINING POLYAMIDE MONOFILAMENT

DESCRIPTION

1. Technical Field

This invention relates to a radial tire containing polyamide monofilament as the load bearing member in the carcass ply of the tire.

2. Background

The use of monofilaments in tires has been known for many years. Nylon monofilament has been evaluated by several tire manufacturers for use in the carcass of bias-ply tires. One problem previously experienced with the use of both nylon multifilament and monofilament in the carcass of bias-ply tires has been flat spotting. Flat spotting develops in a bias-ply tire containing nylon where the vehicle is not in use for a period of time such as overnight. The use of a composite reinforcement thread for tires containing fiberglass and monofilament, including nylon, was disclosed in U.S. Pat. No. 3,692,080 for use in the belt and/or carcasses of bias-ply or radial tires. However, the monofilament was used only in conjunction with the glass fibers and the glass fibers were the load bearing member. Polyester monofilament, wrapped with a hydrophilic yarn, like rayon, has been disclosed as a carcass cord in radial tires in U.S. Pat. No. 3,429,354. The utility of monofilaments, such as steel, nylon, polyester or rayon, as reinforcement for radial tire belts or hoops has been disclosed. The commercial use of monofilament in chaffer fabrics for tires is also known.

Radial tires are characterized by a carcass fabric that is oriented such that its reinforcing cords extend radially from bead to bead (i.e., they lie essentially perpendicular to the direction of travel of the tire).

Normally there are one or two carcass plies in a radial tire, although more plies are possible. Materials typically used to prepare the carcass cords for radial tires are polyester, rayon or nylon multifilament yarns. Belt plies are also characteristic of radial tires. A radial tire typically has two (or more) belt plies which consist of fabric whose reinforcing cords lie nearly parallel (usually at an angle of 10 to 30 degrees) with the circumferential direction of travel of the tire. The belt plies serve to stiffen the tread area and restrict movement of the carcass cords underneath. Belt cords typically are made of high modulus materials such as steel wire, Kevlar® aramid fibers or glass.

SUMMARY OF THE INVENTION

A pneumatic radial tire comprising at least one pair of bead portions and at least one carcass ply wrapped around the bead portions, wherein each carcass ply comprises a rubberized layer of load bearing polyamide monofilaments has now been discovered. The polyamide monofilament is characterized by a denier of greater than 100, preferably 1,000–10,000 denier and more preferably 2,000–5,000 denier and a tenacity of at least 7.0 g/den, preferably 8–14 g/den.

In a composite such as a carcass ply of nylon tire cord and rubber, the cord is the load bearing member because it is the higher modulus member; i.e., under stress, the nylon bears most of the stress, while the rubber with a much higher elongation to break primarily stretches. For a composite cord, the higher modulus component will be load bearing. For example, in a nylon and glass cord, the glass will bear most of the stress.

The monofilament nylon fiber carcass cords of this invention require no covering fiber or combination with any other fiber, yarn or cord, and can be readily bonded to rubber to produce a radial tire with an outstanding balance of performance and economy. Such radial tires are well-suited for a wide variety of applications, including aircraft, off-the-road, and heavy-duty truck tires, but are particularly well-suited for passenger cars and light trucks. Opposite the incumbent radial tires currently being widely sold in the U.S. and around the world for passenger cars, which are based on multifil polyester carcass cord, radial tires containing nylon monofilament as the carcass reinforcement can be made with 20–40% less fiber and less rubber and still out perform the incumbent tire in terms of durability, strength retention after use, endurance, heat generation and squirm. The tire obviously offers substantial economies from the reduction in cord and rubber, but also from a reduction in plying and twisting costs associated with multifil tire cords.

The carcass ply or plies of this invention containing nylon monofilament can contain any kind of rubber suitable for tire applications including, but not limited to, natural rubber, styrene-butadiene rubber, etc., and appropriate combinations of different rubbers. The number of carcass plies is normally one or two, but can be more. The nylon monofilament cords of the carcass ply or plies lie at an angle of 80°–90° to the circumferential direction of travel of the tire.

The carcass ply or plies reinforced with nylon monofilament can be used in essentially any pneumatic radial tire type or construction. In addition to the carcass ply or plies, the radial tire should have at least a pair of beads, one or more belt plies, and tread and sidewall portions. Such tires may contain other fibers, fabrics or plies in the tread, sidewall or bead areas.

The kind of nylon monofilament suitable as the reinforcement of carcass ply or plies of this invention can be any polyamide monofilament fiber which is suitable for tire cord. Examples of such polyamides are polyhexamethylene adipamide (6,6 nylon), poly-e-caproamide (6 nylon), 4,6 nylon, etc., and coplymers of such polyamides. The polymer of such polyamides preferably contains minor amounts of additives such as polymerization catalysts, usually phosphorus containing materials, and thermal and oxidative protective agents. Examples of the latter would be hindered phenolic materials and copper salts (e.g., cupric acetate) in combination with halide ion (e.g., potassium iodide). The relative viscosity of the nylon monofilament should be at least 50 for tire uses, and preferably at least 70. The cross-section of the monofilament fiber can be of any shape or a combination of different shapes; however, an obround or ribbon-like cross-section is preferred because it permits a reduction in the amount of rubber per carcass ply and yields a more pliable carcass ply for easier turn-ups around the tire bead. The obround cross-section is generally rectangular with rounded corners. A modification ratio of 2 to 4 is preferred, where modifiction ratio is the major axis divided by the minor axis of the cross-section.

TEST METHODS

Tire Temperatures

The temperatures of running tires were determined by inserting thermocouples into the shoulder and into the contained air cavity of the tire during wheel testing. The shoulder thermocouple was located about 0.005" from the carcass ply. The thermocouples were connected to the tires via a slip-ring assembly and temperatures were monitored continuously.

DOT 119 Step Load Endurance Test

The test performed is the basic test described in Motor Vehicle Safety Standard No. 119, Part 571, S119-1, Rev. 2/7/74, plus an extension to the test.

The tire is mounted on an appropriate test rim, inflated to the inflation pressure corresponding to the maximum load rating marked on the side of the tire, and conditioned for 3 hours at 100° F. Pressure is checked and readjusted if necessary (65 psi for an 8.75R/16.5 load range D tire). The tire is tested at 50 mph for 7 hours at 75% (of maximum rated) load, 16 hours at 97% load and 24 hours at 114% load. In testing beyond DOT-199, the tire is then run 500 miles each at 120%, 125%, 130% ... etc., increasing the load in 5% increments every 500 miles until failure.

Bead Area Endurance of Passenger and Truck Tires

This test is designed to induce flex type failures around the turn-up area (without thermal degradation interference) through high load applications.

The tire is mounted on an appropriate heavy-duty test rim and conditioned at 100° F. for 4 hours at 24 psi. The pressure is readjusted to the maximum psi allowed for the specified load range and then conditioned for another 4 hours.

The tire is then tested at 30 mph in the following sequence until failure: 90% load, 2 hours; 115% load, 2 hours; 150% load, 20 hours; 170% 20 hours; 190% load, 20 hours; and 210% load, until failure.

Carcass Strength

Carcass strength is calculated by multiplying the cord strength in lbs. by the number of cord ends per inch in the carcass fabric and multiplying that result by the number of carcass plies in the tire.

Squirm Test

The tire is mounted on an axle which is held in a pivoted frame. This axle is hydraulically loaded against a movable plate or "carriage" which is larger than the footprint of the tire. The carriage contains a transducer which is movable in the meridian direction to the tire so that any area of the footprint can be contacted. The carriage itself is moved by a motor driven screw in a direction tangential to the tire to form the footprint and can also be set to run with a slip angle. The transducer is capable of measuring simultaneously the tread displacement (to ±0.0001 in.) and the contact pressure. The output of the squirm measurement can be displayed on an x-y plotter as well as on a strip chart recorder.

Most measurements were made at 28 psi inflation pressure, 100 percent of the TRA rated load (for 24 psi pressure), and a carriage movement rate of 0.73 in./sec. The transducer is positioned to engage a tread element at its centroid. This is very important since the compression of the rubber causes varying sideways movement at the edges of each tread element due to the Poisson effect. This Poisson movement in the contact plane is mainly dependent on the elastic and frictional properties of the tread compound, the shape and thickness of the element and the contact pressure. The movement of the centroid of each element is of major importance since it is relatively independent of the above variable and is truly dependent on the overriding squirm imposed on the whole element by tire construction. Hence proper positioning of the squirm probe is of major importance and the operator is ensured of this by applying white ink to the point of the probe and making adjustments during trial passes until engagement occurs in the proper place.

Squirm in each rib is measured while rotating the tire in forward and reverse directions. Measurements are made on each of the five ribs in the tires, with both a downward pass and an upward return pass being recorded. There is a rapid movement of the probe at very low pressure as it engages and disenages from the tread element. This is eliminated from the meridian values. The peak-to-peak values of the circumferential and the meridian components are averaged for each rib. These are then used to calculate a resultant deflection vector from the formula:

$$V = \sqrt{\text{Circumferential Deflecton}^2 + \text{Meridianal Deflection}^2}$$

Average work, or squirm, is then calculated from:

$$W = V \times \text{Peak Pressure} \times \text{Coefficient of Friction}$$

A second set of measurements is made on each rib at a location 180° around the tire from the first measurement. Average values are then calculated and reported for the highest wearing rib and also the sum of all five ribs (or total squirm).

EXAMPLES

The tires of all the Control and Example tires of this application were assembled in two stages on a radial tire manufacturing machine made by NRM, Inc., Model RF 1216. The assembled tires were molded and cured in a Bag-O-Matic curing press manufactured by Akron Standard Co.

The D-417B dip bath used for the Control polyester tire cords was composed of: water (83.7 parts by weight); Gum Tragacanth, 2% solution (2.0 parts by weight); N.E.R.-010A Epoxy resin (1.4 parts by weight); and LVBI Isocyanate slurry, 25% dispersion (12.9 parts by weight).

D-5A is a resorcinol-formaldehyde latex-based adhesive and is applied on top of isocyanate-based subcoat adhesive to promote adhesion of cord to rubber when preparing polyester tire cords. When preparing nylon tire cords, D-5A is used without the isocyanate subcoat.

Rivet area is the percent of unreinforced rubber in the carcass or belt plies and is calculated from the following equation:

$$\text{Rivet Area} = 100[1 - (\text{cord guage})(\text{cord ends per inch})]$$

Control 1

8.75R 16.5 light radial truck tires were built using two carcass plies reinforced with conventional 1,000 denier polyester tire yarn containing 192 filaments (T-900; Celanese Co.). The cord was prepared using 9 turns per inch singles twist and 9 turns per inch ply twist. The greige cord was adhesive treated using isocyanate based subcoat and RFL topcoat and cured in the oven at 475° F. and 425° F. temperatures, respectively. The number of cords in the carcass plies of the tires were adjusted to provide 33% rivet area (Table 1). The carcass rubber stock was a 15 mil skim and made up of natural rubber and SBR (styrene-butadiene rubber) in the ratio of 80:20. The sidewall was extruded from the same rubber stock. The innerliner consisted of 75 mil thick sheet made up of chlorobutyl and natural rubber in the ratio of 70:30. The outerliner was 50 mil thick sheet made up of natural rubber and SBR in the ratio of 80:20. The tire belt was designed using two plies of a commercial steel wire embedded in rubber (Table 1). The tires were built from these components along with a pair of appropriate beads and tread rubber stock using the NRM machine. The tires were cured using Uniroyal 16.5" mold with cure cycle "C" (temperature—295° F., pressure—275 psi, time—51 minutes) in the Bag-O-Matic press.

EXAMPLE 1

8.75 R 16.5 light radial truck tires were made like Control 1 except that the reinforcement cord for the carcass plies was 6,6 nylon monofilament instead of polyester multifil. This monofilament was made by the process of U.S. Pat. No. 4,009,511 and had properties described in U.S. Pat. No. 4,056,652. The 3,000 denier nylon monofilament (obround cross-section; 8.4 gpd tenacity; 70 relative viscosity) did not require any twisting or plying to be converted to greige cord. The cord was adhesive treated using a RFL (resorcinolformaldehyde-latex) topcoat (no subcoat needed) and cured in the oven at 420° F. The number of cords in the carcass plies of the tires were adjusted to provide 33% rivet area which resulted in 20% lower green carcass strength and 35–40% less carcass reinforcement fiber versus Control 1 tires. Radial tires were built from the nylon monofilament reinforced carcass in the same manner, with the same steel belt design (Table 1) and the same other components and rubber stocks used for the Control 1.

Table 1 shows the key tire design data (carcass and belt) for both Example 1 and Control 1. Table 2 represents the tire performance results for DOT step load test and bead area endurance test. It can be seen from Table 2 that even with substantially less fiber, Example 1 tires showed distinct advantages in tire durability. Also, Example 1 tires showed significantly lower heat generation as evidenced by tire shoulder temperatures and contained air temperature. The tire shoulder temperatures were determined during the step load durability test.

TABLE 1

| | Example 1 | Control 1 |
|---|---|---|
| Carcass Design | | |
| Reinforcement Fiber | Nylon Monofil | Polyester Multifil |
| Cord Construction | 3,000 denier | 1,000/1/3 |
| Cord Diameter, Mils | 14 × 37 | 26 |
| Ends Per Inch | 18 | 26 |
| Rivet Area, % | 33 | 33 |
| Number of Plies | 2 | 2 |
| Ply Design | 1-ply up/<br>1-ply down | 1-ply up/<br>1-ply down |
| Carcass Strength, lbs./in | 2,100 | 2,506 |
| Common Belt Design | | |
| Steel Wire | 3 × 0.290 + 6 × 0.35 | |
| Ends Per Inch | 14 | |

TABLE 1-continued

| | Example 1 | Control 1 |
|---|---|---|
| Break Strength, lbs. | 381 | |
| Number of Plies | 2 | |
| Belt Strength, lbs. | 10,668 | |
| Belt Cutting Angle | 65°/65° | |

TABLE 2
LIGHT RADIAL TRUCK TIRE PERFORMANCE DOT 119 STEP LOAD ENDURANCE TEST

| | Example 1 | Control 1 |
|---|---|---|
| Tire Failure | | |
| Step Load, % | 160 | 155 |
| Total Miles at Failure | 6,631 | 6,260 |
| Shoulder Temperature, °F. | | |
| 120% Load | 225 | 233 |
| 140% Load | 244 | 254 |
| Contained Air Temperature, °F. | | |
| 120% Load | 187 | 190 |
| 140% Load | 196 | 201 |
| BEAD AREA ENDURANCE TEST | | |
| Tire Failure | | |
| Step Load, % | 210 | 210 |
| Total Miles at Failure | 4,667 | 2,235 |
| Contained Air Temperature, °F. | | |
| 210% Load | 192 | 196 |

Control 2

Radial passenger tires were built utilizing two plies of polyester fabric for carcass reinforcement and two plies of 2+7×0.22+1 steel cord for belts. The polyester yarn utilized for the cord was conventional 1,000 denier, 192 fialment T-900 tire yarn from Celanese Co. This yarn was twisted into a 1,000/1/2 cord construction with 11 turns per inch twist imparted in both plying and cabling steps. This cord was then hot stretched in a two oven process using a conventional 2-step polyester adhesive dip. Specific conditions employed were 470/420° F., 50/80 seconds exposure time, 3/0% applied stretch, D417B/D-5A adhesive. The carcass fabric was then formed from a single end of cord using a drum winding process. Two plies of 20 mil skim rubber (80% natural rubber/20% styrene butadiene rubber) were used in preparing the carcass fabric. Belt plies were formed from steel cord in a similar drum winding process. P225/75R14 tires were then built from this fabric using the NRM Corp. tire building equipment. Other components used in constructing the tire were tread and sidewall sections extruded from styrene-butadiene/natural rubber blends, a 50 mil thick sheet of chlorobutyl/natural rubber innerliner, and a pair of rubber wrapped 5-wire/4-turn beads. The ends of both carcass plies were turned up over the tire bead, with the second ply extending beyond the end of the first ply by about 2½ inches. The green tire was cured at about 295° F. in the Bag-O-Matic tire curing press and then post-inflated for 32 minutes under 35 psi pressure. Additional details of tire construction and radial tire test results are given in Table 3.

EXAMPLES 2 AND 3

Radial tires were built using a construction identical to Control 2 except that two plies of 2,000 denier 6,6 nylon monofilament (obround cross-section; 8.7 gpd tenacity; 70 RV) was used for carcass reinforcement (Example 2). The monofilament did not require twisting. Process conditions used to dip-stretch the monofil cord were 420° F./60 seconds exposure/1.5% applied stretch. A single step adhesive (20%D-5A) was all that was required for the monofil. The number of ends of monofil in the fabric was adjusted to provide the same carcass strength as in the polyester Control 2 fabric. A second set of nylon monofilament tires (Example 3) was built using less rubber (15 versus 20 mil rubber thickness) in the carcass fabric.

Measurements made on the tire tread as it passed through the footprint showed lower squirm for the nylon monofilament reinforced tires. These tires were also cooler running as evidenced by contained air temperatures (CAT) monitored by a thermocouple during Bead Area Endurance (BAE) testing on the indoor test wheel. Contained air temperature averaged about 7° F. cooler for the monofilament tires with 20 mil (equal) skim and 10° F. cooler with 15 mil skim. Durability was fully equivalent to the polyester controls in the indoor wheel test. Additional details of the tire construction and radial tire test results are given in Table 3.

TABLE 3

|  | Control 2 | Example 2 | Example 3 |
| --- | --- | --- | --- |
| Carcass Reinforcement | Polyester | Nylon Monofilament | Nylon Monofilament |
| No. Plies | 2 | 2 | 2 |
| Skim Thickness, Mils | 20 | 20 | 15 |
| Ends/Inch | 26 | 19 | 19 |
| Carcass Str., Lbs./In. | 1,565 | 1,558 | 1,558 |
| Squirm, Mil-Lbs. | | | |
| Highest Rib | 52 | 45 | 42 |
| Total | 154 | 136 | 126 |
| BAE Test | | | |
| CAT @ 90% load, °F. | 153 | 151 | 148 |
| CAT @ 115% load, °F. | 170 | 166 | 161 |
| CAT @ 150% load, °F. | 182 | 179 | 173 |
| CAT @ 170% load, °F. | 192 | 185 | 182 |
| CAT @ 190% load, °F. | 203 | 192 | 192 |
| CAT @ 210% lodd, °F. | 216 | 201 | 201 |

Control 3

LT235/85R16 radial light truck tires were built utilizing two plies of 1,000/1/3 polyester fabric for carcass reinforcement and two plies of 3×0.20+6×0.35 steel cord for belts. The polyester yarn utilized for the cord was conventional 1,000 denier, 192 filament T-900 tire yarn from Celanese Co. This yarn was twisted into a 1,000/1/3 cord construction with 9 turns per inch twist imparted in both plying and cabling steps. The cord was then hot stretched in a two oven process using a conventional 2-step polyester adhesive dip applied before each oven. Specific conditions employed were 470/420° F., 50/80 seconds exposure time, 3/0% applied stretch, D417B/D-5A adhesive in the first and second oven, respectively. The carcass fabric was then formed from a single end of cord using a drum winding process. Two plies of 20 mil skim rubber (80% natural rubber/20% styrene butadiene rubber) were used in preparing the carcass fabric. Belt plies were formed from steel cord in a similar drum winding process. LT235/85R16 (load range E) tires were then built from this fabric using the NRM Corp. tire building equipment. Other components used in constructing the tire were tread and sidewall sections extruded from styrene-butadiene/natural rubber blends, a 75 mil thick sheet of chlorobutyl/natural rubber innerliner, and a pair of rubber wrapped 8-wire/8-turn beads. The ends of both carcass plies were turned up over the tire bead, with the second ply extending beyond the end of the first ply by about 2¾ inches. The green tire was cured at about 295° F. in the Bag-O-Matic tire curing press and then post-inflated for 45 minutes under 35 psi pressure. Additional details of tire construction and tire test results are given in Table 4.

EXAMPLES 4 AND 5

Radial tires were built with a construction identical to Control 3 except that two plies of 3,000 denier 6,6 nylon monofilament (obround cross-section; 8.7 gpd tenacity; 70 RV) was used for carcass reinforcement. The monofil did not require twisting and conditions used to process the monofil were identical to those described in Examples 2 and 3 above. In Example 4, the number of ends of monofilament in the fabric was adjusted to provide the same carcass strength as in the polyester control fabric. A second set of nylon monofilament tires was built using less rubber (15 mil rubber thickness versus 20 mil rubber) in the carcass fabric (Example 5). The monofilament reinforced tires were cooler running as evidenced by contained air temperatures monitored by a thermocouple during Bead Area Endurance (BAE) testing on the indoor test wheel. Contained air temperature was an average of 9° F. cooler for the Example 4 tires with equal skim rubber thickness (20 mil) and 16° F. cooler when 15 mil rubber was used, Example 5. Tire construction and testing details are given in Table 4.

TABLE 4

|  | Control 3 | Example 4 | Example 5 |
| --- | --- | --- | --- |
| Carcass Reinforcement | Polyester | Nylon Monofilament | Nylon Monofilament |
| No. Plies | 2 | 2 | 2 |
| Skim Thickness, Mils | 20 | 20 | 15 |
| Ends/Inch | 27 | 20 | 20 |
| Carcass Str., Lbs./In. | 2,392 | 2,392 | 2,392 |
| BAE Test | | | |
| CAT @ 90% load, °F. | 162 | 156 | 150 |
| CAT @ 115% load, °F. | 177 | 169 | 163 |
| CAT @ 150% load, °F. | 193 | 184 | 176 |

TABLE 4-continued

| | Control 3 | Example 4 | Example 5 |
|---|---|---|---|
| CAT @ 170% load, °F. | 205 | 195 | 186 |
| CAT @ 190% load, °F. | 218 | 204 | 201 |

I claim:

1. A pneumatic radial tire comprising at least one pair of bead portions and at least one carcass ply wrapped around said bead portions wherein each carcass ply comprises a rubberized layer of load bearing polyamide monofilaments wherein the polyamide monofilament is characterized by a denier of greater than 100, and a tenacity of greater than 7.0 g./den, said polyamide monofilaments being the primary load bearing reinforcement in the carcass of said tire, said tire further comprising at least one belt ply containing reinforcing cords which lie at an angle of about 10 to about 30 degrees with respect to the circumferential direction of travel of the tire.

2. The tire of claim 1 wherein the tenacity of the monofilament is 8-14 g/den.

3. The tire of claim 1 wherein the denier of the monofilament is 1,000-10,000.

4. The tire of claim 2 wherein the denier of the monofilament is 2,000-5,000.

5. The tire of claim 1 wherein the carcass polyamide monofilament is further characterized by being of an obround shape.

6. The tire of claim 5 wherein the monofilament is at least 80 mole % 6,6 nylon.

7. The tire of claim 1 wherein said tire is a passenger car tire.

8. The tire of claim 1 wherein said monofilaments are substantially untwisted.

9. The tire of claim 1 wherein said tire is a light truck tire.

* * * * *